United States Patent [19]

Zajdlik

[11] 4,447,322

[45] May 8, 1984

[54] APPARATUS FOR THE CYCLONE SEPARATION OF LIQUIDS HAVING DIFFERENT DENSITIES

[75] Inventor: Miroslav Zajdlik, Bratislava, Czechoslovakia

[73] Assignee: Vyskummy ustav vodneho hospodarstva, Bratislava, Czechoslovakia

[21] Appl. No.: 493,001

[22] Filed: May 9, 1983

[30] Foreign Application Priority Data

May 7, 1982 [CS] Czechoslovakia ............... 3299-82

[51] Int. Cl.³ ............................................ B01D 21/24
[52] U.S. Cl. ............................ 210/104; 210/304; 210/307; 210/512.1
[58] Field of Search ............... 210/103, 104, 117, 136, 210/304, 307, 313, 512.1

[56] References Cited

U.S. PATENT DOCUMENTS

| | | | |
|---|---|---|---|
| 2,000,137 | 5/1935 | Kelly | 210/512.1 |
| 2,302,116 | 11/1942 | Gill | 210/512.1 |
| 3,825,120 | 7/1974 | Takahashi | 210/117 |
| 3,849,310 | 11/1974 | Condolios | 210/512.1 |

Primary Examiner—John Adee

[57] ABSTRACT

Apparatus for the vortical separation of liquids having different densities with automatic delivery thereof, such apparatus being suitable, for example, for the separation of oil from waste water. An improvement in efficiency over prior art vortex separators is achieved by disposing a conical insertion piece in the cylindrical housing of a vortex separator, the housing having a cylindrical bottom below which there is disposed a coaxially located vortex chamber to which feed piping is tangentially attached, by providing a slanting bottom for the housing for the filter, and by employing a conical mantle to close the upper part of the filter housing. In the space above the conical insertion piece there are tangentially attached to the cylindrical housing of the filter a discharge piping and a pump, the delivery port of such pump being connected to the lower part of the filter housing. A storage reservoir is tangentially attached to the upper filter housing through discharge piping, and also attached thereto is run-back piping which is connected to the feed piping for the vortex chamber. A discharge coupling is connected to the housing for the filter below the slanting bottom thereof, such coupling being selectively closed by an electromagnetic valve.

4 Claims, 1 Drawing Figure

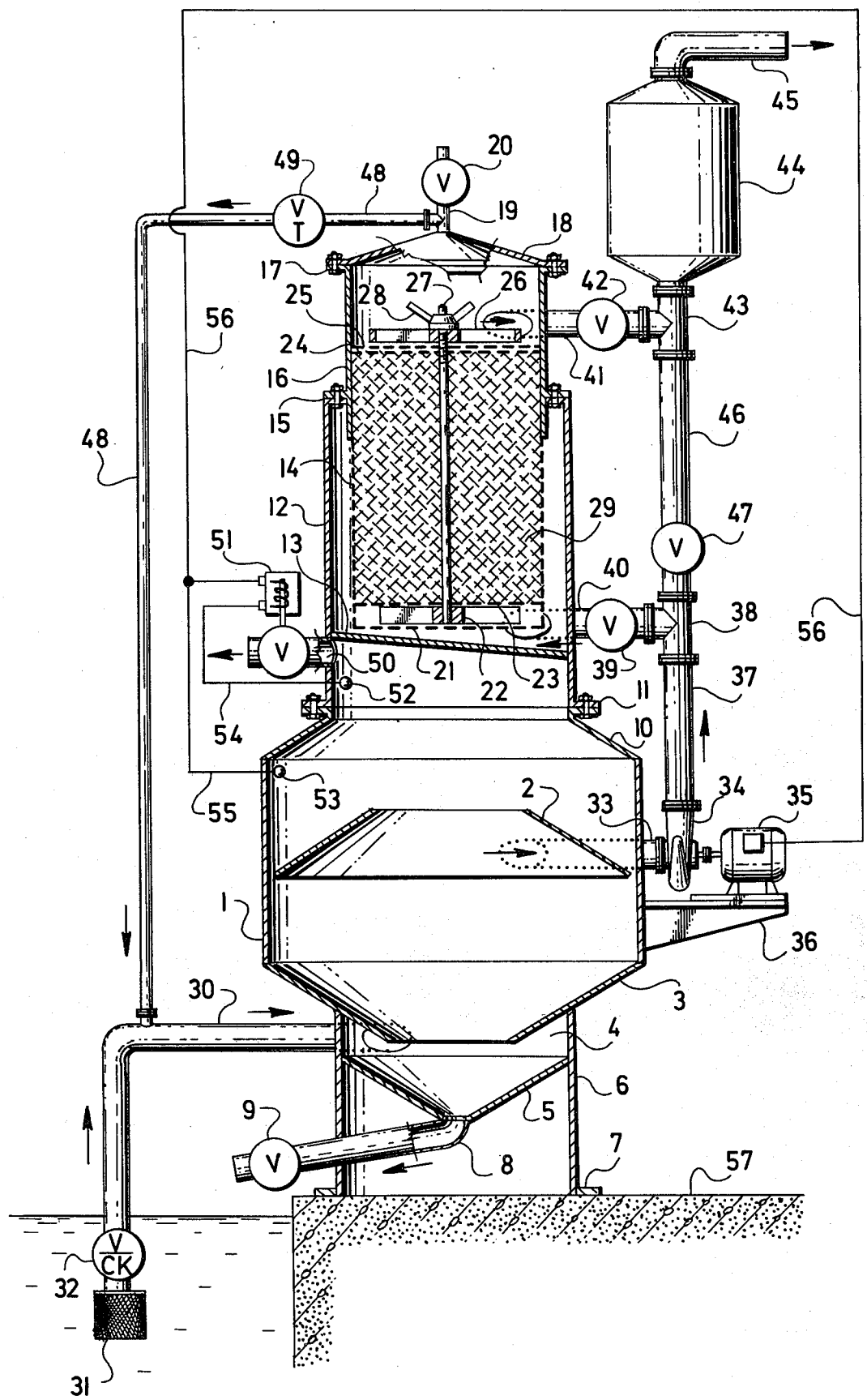

APPARATUS FOR THE CYCLONE SEPARATION OF LIQUIDS HAVING DIFFERENT DENSITIES

This invention relates to an apparatus for the cyclone or vortical separation of liquids having different densities, such apparatus having an automatic delivery. The apparatus has a pump, a filter, and a vortex or cyclone separator with tangentially attached discharge piping connected to the pump. The reservoir is closed in its lower part with a conical bottom, and the vortex chamber thereof is provided with tangentially attached feed piping with a suction basket or filter and a run-back closure.

The effect of gravitational forces or the effect of centrifugal forces has been employed in various types of hydraulic separators for the separation of liquids having different densities, for example the separation of dispersed oil particles from waste water. Various constructions of lamellar insertion pieces and coalescent filters are employed for improving the effect of agglomeration of small oil particles into larger units. The drawbacks of such prior art apparatus are the complexity of their construction and the considerable requirements for their operation and maintenance, mainly in the cleaning of lamellae and in the exchange of filter fillings. Most frequently, various constructions of open reservoirs are in use, from which separated oil and water are taken away by way of overflow lips.

The drawbacks of such construction is the requirement for the accurate setting of the overflow lips. Open separators with overflow lips are not suitable for operation in vehicles or vessels, since even small swings or shakings of the apparatus can substantially worsen the efficiency of the separator. Waste water is often pumped from collection tanks into separators using centrifugal pumps. The connection of the separator to the delivery piping of the centrifugal pump is quite disadvantageous, because in the pump separated liquid is dispersed into very small particles by the intensive vortical motion of the liquid, which makes their separation substantially more difficult. The connection of the separator into suction piping before the inlet to the separator is more advantageous, but this arrangement requires solving the problem of providing a reliable device for pumping-off the separated oil.

It has now been found that the drawbacks of the above-described prior art devices are eliminated to a substantial measure by the apparatus of the present invention for the vertical separation of liquids having different densities, such apparatus having an automatic delivery. The apparatus of the invention has a pump, a filter and cylindrical housing of the vortex or cyclone separator with tangentially attached discharge piping connected to the pump. The cylindrical housing of the vortex separator is closed in its lower part with a conical bottom, below which the vortex chamber is provided with tangentially attached feed piping with a suction basket and a run-back closure.

An important feature of the invention is that a conical insertion piece is disposed in the cylindrical reservoir of the vortex separator coaxial thereof, and the upper part of the cylindrical reservoir of the vortex separator is closed by a conical end clause above which the housing of the filter is attached by a sealing joint disposed coaxial of the housing. The lower part of the housing of the filter is closed by an oblique or slanting bottom, and the housing is closed in the upper part by an upper sealing joint, the upper housing of the filter being closed by a conical cover disposed coaxially thereof. Delivery piping, changing-over branch piping, changing-over closure and inlet piping tangentially attached to the lower part of the filter reservoir are connected to the pump. To the upper filter cylinder there is tangentially attached discharge piping which is connected using a discharge closure through discharge branch piping to a storage reservoir provided with outlet piping. A discharge coupling is further connected to the filter housing below the slanting bottom, which coupling is selectively closed by an electromagnetic valve which is connected by an electric circuit with an upper liquid level detector and by an interconnecting electric circuit with a lower liquid level detector. The electromagnetic valve is connected with the electric motor which drives the pump by means of a further interconnecting electric circuit.

It is advantageous to provide the apparatus according to the invention with a distributing coupling with a de-aerating valve attached coaxially to the conical cover of the upper filter housing, and by connecting the distributor coupling run-back piping through a regulating valve, which piping is discharged into feed piping tangentially attached to the vortex or cyclone chamber.

It is also advantageous to connect the delivery piping from the pump of the device according to the invention through changing-over branch piping and a by-pass valve using by-pass piping and discharge branch piping to the storage reservoir and outlet piping.

By the tangential supply of separated liquids into the vortex or cyclone chamber, and by the location of conical insertion pieces in the cylindrical housing of the vortex separator, a gradual passing from a regime of rotary turbulent flow of liquid to a regime of lamellar flow thereof is provided. The conical insertion piece permits the agglomeration of small oil particles into larger units, whereby a higher efficiency of the vortex separator is achieved. The combination of the vortex separator with a filter and a pump into an integrated constructional unit with a connecting cylindrical reservoir of a vortex separator before the inflow to the pipe and filter for delivery piping of the pump are the main advantages of the invention.

By the above-described connection the disadvantageous effect of the pump for forming turbulence is eliminated; such turbulence is of a high degree and is accompanied by the dispersing of a larger amount of separated liquid, for example oil, into very small particles. The device according to the invention is of simple, easily manufactured construction, a further advantage of which is also that of simple assembly, simple cleaning and maintenance, and also the possibility of its use with vehicles or vessels, inasmuch as swings or shakings of the apparatus do not greatly affect its efficiency. The apparatus according to the invention has a very small loss in fluid pressure. Such apparatus also provides for the automatic delivery of separated liquids using an electromagnetic valve in the discharge coupling, such valve being automatically opened after the pump is stopped when the upper liquid level detector is immersed in a layer of separated, specifically lighter liquid.

The apparatus of the invention will be more readily understood upon consideration of the accompanying drawing, in which:

The single FIGURE of the drawing is a schematic view of an exemplary embodiment of the apparatus of the invention, such view being partially in vertical section through the perpendicular axis of the cylindrical reservoir of the vortex separator and partially in side elevation.

DESCRIPTION OF THE APPARATUS

Turning now to the drawing, the lower end of the cylindrical housing of the vortex separator 1 is partially closed by a downwardly converging frusto-conical bottom 3, below the open bottom of member 3 there being provided a bottom vortex chamber 4 made up of a cylindrical outer wall 6 and a lower downwardly converging conical bottom 5 contained within part 6, parts 5 and 6 being coaxial with the vortex separator 1. The lower end of the cylindrical member 6 is provided with a flange 7 which rests upon and is connected to the foundation 57. The lower end of the vortex chamber 4 is connected by discharge piping 8 which has a selectively closeable discharge valve 9 connected thereto. To the cylindrical part of the vortex chamber 4 there is tangentially attached feed piping 30; piping 30 has a suction basket or screen 31 and a run-back valve 32 connected to its inlet end.

The upper end of the cylindrical housing of the vortex separator 1 is closed by an upwardly converging frusto-conical mantle 10 above which a vertical circular cylindrical housing for a filter 29 is attached by a flange connection 11. The lower part of the housing 12 for the filter 29 is closed by an obliquely disposed or slanting bottom 13. The upper part of the housing 12 of filter 29 is connected by an upper flange connection 15 to filter 29; the cylinder 16 of filter 29 is located coaxially of the housing 12 and is closed at its upper end by an upwardly converging conical cover 18 which is clamped and sealed in place on cylinder 16 by confronting flanges held together by bolts or clamps, as shown at 17.

A distributing coupling 19 with a de-aerating valve 20 is located coaxial of the cylinder 16. A regulating valve 49 and run-back piping 48 are connected to the distributing coupling 19, such piping 48 being connected to feed piping 30 which, as we have seen above, is attached tangentially to vortex chamber 4 below the conical bottom 3 of the cylindrical portion of vortex separator 1. Above the conical insertion piece 2 within the vortex separator 1 there is tangentially connected discharge piping 33 which leads to the intake port of pump 34. Delivery pipe 37 is connected to the outlet port of the pump 34, and in that order there are interposed in piping 37 branch piping 38, by-pass closure valve 47, by-pass piping 46, outflow branch piping 43, storage reservoir 44, and discharge piping 45 leading from the top of reservoir 44. Branch piping 38 includes a changing-over valve 39 and inflow piping 40, piping 40 being tangentially connected to the lower part of the housing 12 for the filter 29. To the upper housing 16 for the filter 29 there is tangentially attached outflow piping 41 which is connected by an outflow valve 42 through outflow branch piping 43 to storage reservoir 44. Connected to the housing 12 for filter 29 below the slanting bottom 13 thereof there is connected a discharge coupling 50 having an electromagnetic valve 51 connected thereto. Valve 51 is connected by an electric circuit 54 with a high water level detector 52 and by a circuit 55 with a lower oil layer height detector 53. Electromagnetic valve 51 is connected with the electric motor 35 for pump 34 by means of an electric circuit 56. Motor 35 with pump 34 are supported on a bracket 36 which is attached to the vortex separator 1.

Below the upper cylindrical housing of filter 29 there is connected a perforated cylinder 14 of the filter coaxial therewith; the filter 29 has a perforated bottom 21 at its lower end. Above the perforated bottom 21 there is disposed the stiffener of a lower perforated insertion piece 22, a centrally disposed vertical threaded rod 27, a lower perforated insertion piece 23, all of such parts together with filtration filling being located coaxially. The filling is pressed from above by the upper perforated insertion piece 24, above which a circular insertion piece 25 with a stiffener for an upper perforated insertion piece 26 and hand nut 28 are disposed coaxially within the housing 12, 16. Delivery piping 37 from pump 34 is connected through interconnecting branch piping 38 and through by-pass closure 47 by means of by-pass piping 46 with outflow branch 43 to storage reservoir 44 and discharge piping 45.

The Manner of Operation of the Apparatus

Waste water with oil particles is lead into the device described above through the suction basket 31 and through run-back valve 32 by the inlet piping 30 in a tangential direction into the vortex chamber 4 below the conical bottom of the cylindrical housing of the vortex or cyclone separator 1. Under the effect of the centrifugal forces of the rotary motion of the water, heavier impurities are separated from the liquid and deposited at the conical bottom of vortex chamber 5 from which they can be discharged by blow-off piping 8 after the discharge closure 9 has been opened. Water with dispersed oil particles flows in a rotary spiral motion through the central round opening at the conical bottom 3 into the space of the cylindrical housing of the vortex separator 1 after the separation of the heavier impurities. In this space particles of water and oil gradually obtain larger diameters of spiral motion, and as a result of this their velocities and turbulence are decreased.

A gradually passing from a turbulent regime of flow to a regime of lamellar flow takes place here. Below the conical insertion piece 2 small oil particles agglomerate into larger units. In the space of the cylindrical housing of the vortex separator 1 lamellar rotary flow occurs, which also enables an effective separation of very small oil particles dispersed in water. Separated water as a specifically heavier liquid flows under the effect of centrifugal forces to the wall of the cylindrical housing of the vortex separator 1, and separated oil is accumulated in the space around the central vertical axis of such housing. In the upper part of the cylindrical housing of the vortex separator 1 below the slanting bottom 13 of the filter 29 a continuous layer of separated oil is gradually formed, which oil is automatically led by discharge coupling 50 after the opening of the electromagnetic valve 51.

The separated water, now rid of most of the oily compounds, is led from the space above the conical insertion piece 2 by discharge piping 33 which is tangentially attached to the upper part of the cylindrical housing of the vortex separator 1. From the discharge piping 33 water with residues of still unseparated oil is pumped through pump 34 and delivery piping 37 and through changing-over branch piping 38 and changing-over valve 39 into inflow piping 40. Such inflow piping 40, as we have seen, is tangentially attached to the lower part of the housing 12 for the filter 29.

In the housing 12 for the filter 29, water with residues of unseparated oil flows in a rotary spiral motion through the perforated bottom 21 and through the perforated cylinder 14 of the filter 29. Filtration filling pressed in the perforated cylinder or housing 14 of filter 29 in the space between the lower perforated insertion piece 23 and the upper perforated insertion piece 24 acts as a coalescent filter upon which small particles of until now unseparated oil are caught. These particles agglomerate into larger units in the filtration filling, such larger units being concentrated at the axis of the perforated cylinder 14 of the filter 29 under the effect of centrifugal forces of spiral rotary motion of the water, and they flow together with water in the upward direction into the space below the conical cover 18 of the upper housing 16 of the filter 29.

Separated water cleared from residues of oily particles is discharged from the upper cylindrical housing 16 of filter 29 by tangentially connected outflow piping 41 through outflow branch piping 43 into storage reservoir 44, from which it is taken off by the outflow piping 45. The separated oil, together with a smaller part of separated water, is taken away from the space below the conical cover 18 through the distributing coupling 19 and through the regulating valve 49 by run-back piping 48 into the input piping 30 which is tangentially attached to and leads into vortex chamber 4 below the conical bottom 3 of the cylindrical housing of the vortex separator 1.

After the pumping of waste water has ended, simultaneously with the switching-off of electric current to the electric motor 35 which drives pump 34, an electric signal is led by the circuit 56 to the electromagnetic valve 51 which is thereby opened, but only under the condition that the upper level detector 52 of the water level is immersed in a layer of separated oil; this condition is indicated by an electric signal from detector 53 through conductor 54 which connects detector 52 to the electromagnetic valve 51.

After the electromagnetic valve 51 is opened, the layer of separated oil is driven out from the upper part of the cylindrical housing of vortex separator 1 through the outflow coupling 50 under the effect of the overpressure of separated water, which starts to flow back from the storage reservoir 44 through outflow branch piping 43 through outflow valve 42 and outflow piping 41 to the upper housing 16 of filter 29. Water flows back from the space within the upper housing 16 into the cylindrical housing of the vortex separator 1 simultaneously through two circuits (A and B). Through the first (A) of these two circuits, water flows from the upper cylindrical housing 16 of filter 29 through distributing coupling 19 and regulating valve 49 by run-back piping 48 and input piping 30 into vortex chamber 4 from which it flows through a hole in the conical bottom 3 into the cylindrical housing of the vortex separator 1. In such back motion, water cannot flow out from inlet piping 30 through suction basket 31 because under the effect of water over-pressure the run-back valve 32 is closed. In the second (B) of the above-named circuits through which water flows back into the cylindrical housing of the vortex separator 1, water from the upper cylindrical housing 16 of filter 29 flows back through the filtration filling into the lower reservoir part 12 of the filter 29 through the changing-over valve 39, changing-over branch piping 38, and by delivery piping 37 through pump 34 and by discharge piping 33 back into the cylindrical housing for the vortex separator 1.

When the water level below the layer of separated oil rises in the cylindrical housing of vortex separator 1 up to the level of the upper water level detector 52, an electric signal is emitted by detector 52 through the conductor 54 so as to actuate valve 51 to close the discharge of separated oil through discharge coupling 50. After the electromagnetic valve 51 has closed, pumping of waste water by pump 34 can again be started by energizing motor 35. In an exceptional case, in the course of pumping waste water with an extremely high oil concentration, and when, as a result, the layer of separated oil accumulates in the cylindrical housing of the vortex separator 1 up to the level of the lower oil level detector 53, detector 53 emits an electric signal which travels through the interconnecting circuit 55 to the electromagnetic valve 51. Thereupon valve 51 is opened, and simultaneously therewith electric motor 35 and pump 34 are switched off by the electric signal transmitted thereto through the interconnecting circuit 56. The layer of separated oil is again displaced by water by run-back flowing from storage reservoir 44 to the cylindrical housing of the vortex separator 1 until water rises to the level of the higher liquid level detector 52. This interrupted cycle of operation is automatically repeated.

During the exchange of the filtrating filling and the cleaning of the housing 12 for the filter 29, the cylindrical housing of the vortex separator 1 can be operated by interconnecting delivery piping 37 with outflow piping 45 through the storage reservoir 44, discharge branch piping 43, by-pass piping 46, and interconnecting branch piping 38 after opening the by-pass valve 47 and closing the switching-over valve 39 and the discharge valve 42.

The apparatus according to the invention can also be used without the pump 34, when, for example, water with oil particles flows through feed piping 30 into the vortex chamber 4 under gravity flow with such overpressure that separated water can freely flow off through discharge piping 45.

Although the invention is illustrated and described with reference to a single preferred embodiment thereof, it is to be expressly understood that it is in no way limited to the disclosure of such preferred embodiment but is capable of numerous modifications within the scope of the appended claims.

I claim:

1. In an apparatus for the vortical separation of liquids having different densities with automatic delivery, such apparatus having a pump with an inlet port and a discharge port, a filter, and a vortical separator with a cylindrical housing with tangentially attached discharge piping connected to the pump, the improvement wherein the housing of the vortex separator has a slanting bottom, the bottom of the cylindrical housing communicating with a vortex chamber disposed therebelow, a conical insertion piece within the housing for the vortex separator, feed piping tangentially attached to the vortex chamber, a housing containing a filter being disposed coaxial of and above the cylindrical housing for the vortex separator, the discharge piping and the pump being attached to the cylindrical housing for the vortex separator above the conical insertion piece therein, means connecting the delivery port of the pump to the lower part of the housing for the filter, discharge piping with a storage reservoir being tangentially attached to the upper end of the housing for the filter, run-back piping being connected into feed piping leading to the vortex chamber, a discharge coupling connected to the housing for the filter beneath the slanting bottom thereof, and an electromagnetic valve selectively opening and closing said discharge coupling.

2. Apparatus according to claim 1, wherein the filter housing has a conical cover, a distributing coupling with a de-aerating valve is attached coaxially to the conical cover for the filter housing and to a distributing coupling on the cover of the filter housing, the run-back piping is connected through a regulating valve, and the run-back piping is discharged through the tangentially attached feed piping to the vortex chamber.

3. Apparatus according to claim 1, wherein the delivery piping from the pump is connected through changing-over branch piping and a by-pass valve through the by-pass piping and discharge branch piping to the storage reservoir and thence to the outlet piping from the storage reservoir.

4. In an apparatus for the vortical separation of liquid having different densities with automatic delivery, said apparatus having a pump, a filter, a vortex separator, a cylindrical housing for the vortex separator, discharge piping tangentially attached to the housing and to the pump, the reservoir being closed in the lower part thereof with a conical bottom and with a vortex chamber provided with tangentially attached feed piping with a suction basket and a run-back closure, the improvement wherein a conical insertion piece is disposed in the cylindrical housing for the vortex separator coaxially thereof, the upper part of the cylindrical housing of the vortex separator is closed by an upwardly converging frusto-conical housing part above which there is attached the housing for a filter, the two housings being coaxial, the housing for the filter being closed at the bottom thereof by a slanting bottom and in the upper part thereof by an upper sealing joint, the upper housing part for the filter being closed by a upwardly converging cover coaxial thereof, delivery piping, changing-over branch piping, changing-over closure and inlet piping being tangentially attached to the lower part of the housing for the filter and being connected to the pump and to the upper housing for the filter, discharge piping tangentially attached to the upper part of the housing for the filter and connected through a discharge valve through and through discharge branch piping to a storage reservoir, discharge piping for said reservoir, a discharge coupling being connected to the housing for the filter beneath the slanting bottom of the housing, such coupling being ended by an electromagnetic valve which is connected by an electric circuit with an upper fluid level detector and by a further interconnecting circuit with a lower liquid level detector, the electromagnetic valve being further connected with the electric motor for the pump by a still further electric circuit.

* * * * *